C. S. VAUGHN.
AUTOMOBILE SIGNAL.
APPLICATION FILED MAY 23, 1913.

1,097,689.

Patented May 26, 1914.

2 SHEETS—SHEET 1.

Witnesses
B. F. Brown
Henry F. Bright

Inventor
C. S. Vaughn
By Chandler & Chandler
Attorneys

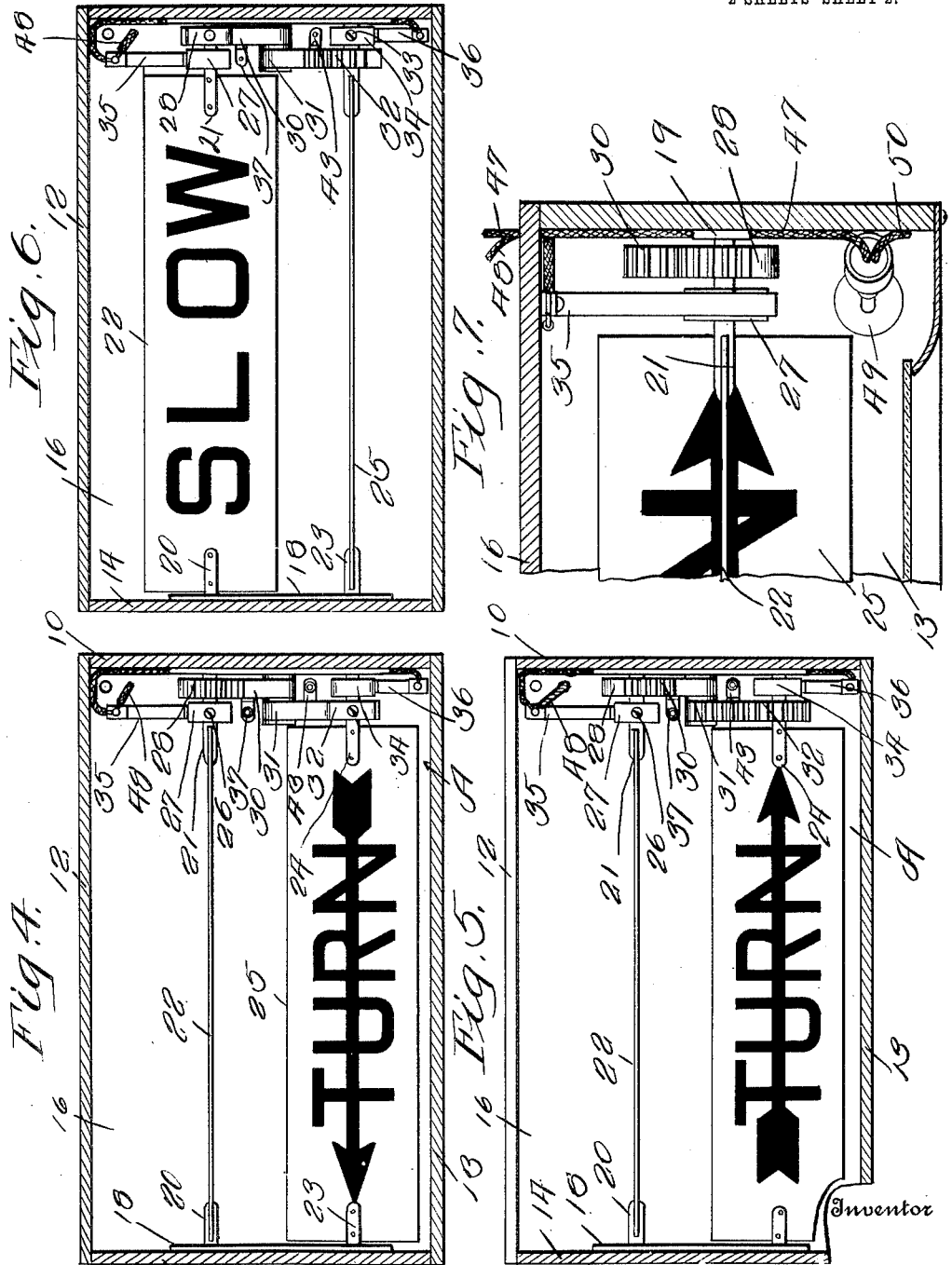

UNITED STATES PATENT OFFICE.

CYRUS S. VAUGHN, OF NEW ROCHELLE, NEW YORK.

AUTOMOBILE-SIGNAL.

1,097,689.　　　　Specification of Letters Patent.　　Patented May 26, 1914.

Application filed May 23, 1913. Serial No. 769,514.

*To all whom it may concern:*

Be it known that I, CYRUS S. VAUGHN, a citizen of the United States, residing at New Rochelle, in the county of Westchester, State of New York, have invented certain new and useful Improvements in Automobile-Signals; and I do hereby declare the following to be a full, clear, and exact description of the invention, such as will enable others skilled in the art to which it appertains to make and use the same.

This invention relates to automobile signals.

The object of the invention resides in the provision of an automobile signal which can be operated by the driver of the automobile so as to indicate to vehicles following that he intends to either stop, slow down, turn to the right or turn to the left.

A further object of the invention resides in the provision of a signal of the character named which includes an electric light adapted to be illuminated when the signal is set and extinguished when the parts of the signal are in unset position whereby the signal may be observed at night without the necessity of maintaining same constantly illuminated.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1:
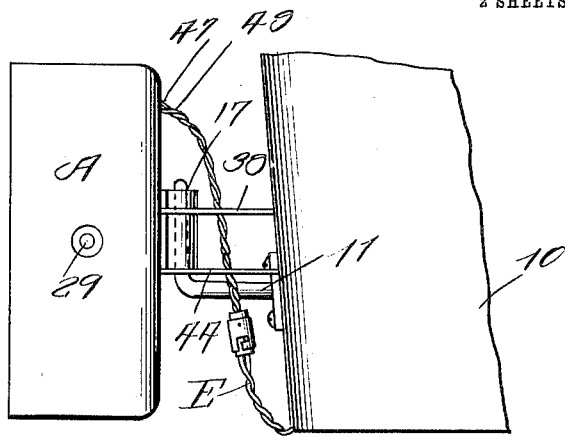
Figures 2, 3:
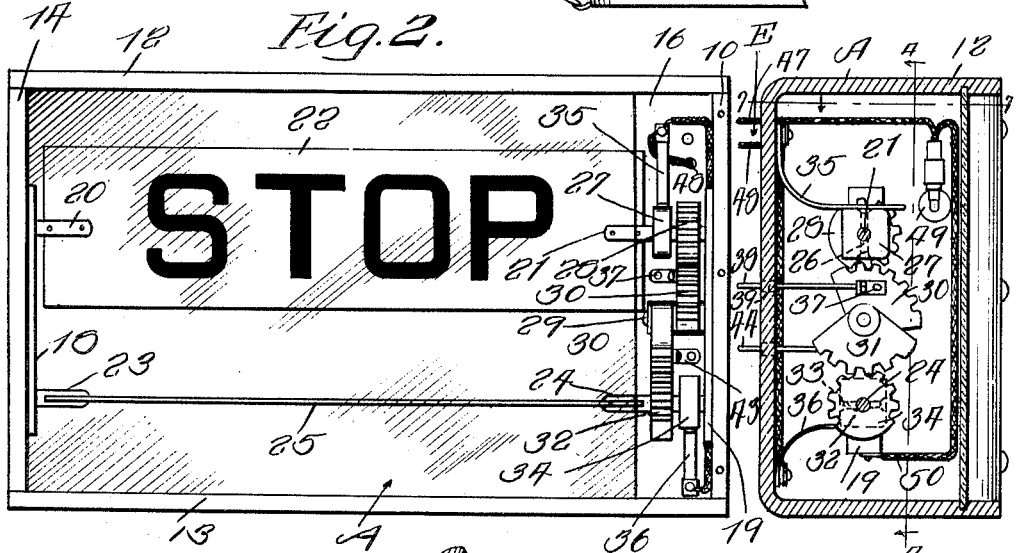
Figure 8:
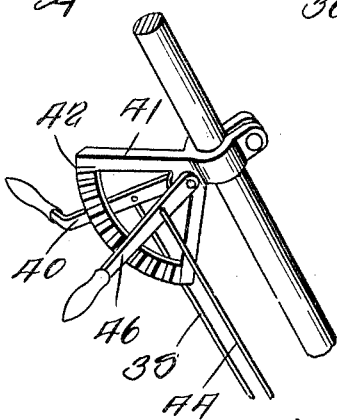

Figure 1 is a side view partly in section of a signaling device constructed in accordance with the invention and showing the manner of supporting same upon an automobile at the rear of the latter, the "Stop" signal being set in his instance; Fig. 2, a rear view of Fig. 1 with the shade plate and lamp removed for the sake of clearness; Fig. 3, a section on the line 3—3 of Fig. 2; Fig. 4, a section on the line 4—4 of Fig. 3 with the "Turn to the left" signal set; Fig. 5, a similar view of the "Turn to the right" signal set; Fig. 6, a similar view with the "Slow" signal set; Fig. 7, a section on the line 7—7 of Fig. 3, with the shade plate in place, and Fig. 8, a detail perspective view showing the construction for operating the device from the steering column of the automobile.

Referring to the drawings 10 indicates the rear of the body of an automobile to which is secured a bracket 11. The signaling device is shown as comprising a casing A constructed of metal and including a top 12, bottom 13, side members 14 and 15 and a rear wall 16. Secured to the rear wall 16 is an eye member 17 which is adapted to be engaged over the bracket 11 to secure the signaling device to the automobile as will be apparent. Mounted on the inner sides of the side members 14 and 15 are vertical bearing plates 18 and 19 respectively. Journaled in bearing plates 18 and 19 respectively are the trunnions 20 and 21 of an upper signal plate 22 which has suitably indicated on one side the word "Stop" and on the other side the word "Slow." Also journaled in the plates 18 and 19 are the trunnions 23 and 24 respectively of a lower signal plate 25 which latter has suitably indicated on one side the word "Turn" with an arrow pointing to the right and on the other side the word "Turn" with an arrow pointing to the left. Fixed on the trunnion 21 by means of alined screws 26 is a square block 27 formed of suitable insulating material. Also fixed on the trunnion 21 between the block 27 and the bearing plate 19 is a segmental gear, 28. Mounted on the bearing plate 19 and projecting inwardly of the casing beneath trunnion 21 is a rod 29 on which is rotatably mounted a segmental gear 30 meshing with the segmental gear 28. Also rotatably mounted on the rod 29 is a segmental gear 31 for a purpose that will presently appear. Fixed on the trunnion 24 is a segmental gear 32 which meshes with the segmental gear 31 and also fixed on this trunnion 24 by means of alined screws 33 is a square block 34. Anchored to the inner side of the rear wall 16 is one end of a leaf spring 35 which bears upon the edge of the block 27 and is adapted to engage the outer ends of the screws 26 as said block is rotated. Also anchored to the inner side of the rear wall 16 is one end of a leaf spring 36 which engages the edge of the block 34 and is adapted to contact with the outer ends of the screws 33 as said block 34 is rotated.

Secured to the side of the segmental gear 30 remote from the side wall 15 is a bracket 37 to which is connected one end of a rod 38. This rod 38 extends through an opening 39 in the rear wall of the casing and has its other end secured to a lever 40 pivoted upon a bracket 41 mounted upon the steering column of the automobile. Also mounted upon the bracket 41 is a segment 42 which is provided with suitable teeth for coöperation with the lever 40. By this construction it will be apparent that by moving the lever 40 the upper signal plate 22 can be rotated so as to dispose same in vertical position with either side disposed adjacent the outer end of the casing A or in a horizontal position so that the edge of said plate will only be visible from the open end of the casing. Secured to the side of the segmental gear 31 is a bracket 43 which has connected thereto one end of a rod 44 which passes through an opening in the rear wall of the casing A and has its other end secured to a lever 46 pivoted to the bracket 41 and coöperating with the segment 42. From this construction it will be apparent that by moving the lever 46 on its pivot the lower signal plate 25 can be rotated to dispose same in vertical position with either side adjacent the outer end of the casing A, or to dispose said plate 25 horizontal with only the edge thereof visible from the outer end of the casing.

In order to illuminate the device when a signal is set there is provided an electrical source E from which extend conductor wires 47 and 48. Both of these wires are carried through the rear wall of the casing A and the wire 47 is attached to one of the poles of an electric lamp 49 mounted on the side wall 15 of the casing. Leading from the other pole of the lamp 49 is a wire 50 which is connected to the bearing plate 19 so as to include the casing A in the circuit supplied by the electric source E and to be hereinafter referred to. The wire 48 is connected to the inner end of the spring 35 and then connected to the inner end of the spring 36. Mounted upon the casing A so as to shield the lamp 49 from view is a shade plate 51 which also serves to reflect the light against the plates 22 and 25 when the latter are in signaling position. When the plate 22 has been rotated to a position to signal either "slow" or "stop" an electric current will be established through the wire 48, spring 35, one of the screws 26, trunnion 21, casing A, wire 50, lamp 49 and wire 47 so that the lamp 49 will be illuminated. When the plate 25 has been rotated to a position to signal either "turn to the right" or "turn to the left" a circuit will be established through the wire 48, spring 36, one of the screws 33, trunnion 24, casing A, wire 50, lamp 49 and wire 47 so that said lamp will be illuminated. When neither of the plates 22 or 25 are disposed in signaling position no current will pass through the lamp 49 and the signaling device under these conditions will be practically invisible at night.

It will be noted that not only do the springs 35 and 36 act as circuit closers in conjunction with the screws 26 and 33 respectively but they will serve by bearing upon the edges of the blocks 27 and 34 respectively to hold the plates 22 and 25 against rotation from a given set position as the result of jars and vibrations incident to travel.

What I claim is:—

1. In a signal for vehicles, the combination of a casing having an observation opening, a plate including trunnions at its ends rotatably mounted in respective sides of the casing and having signal terms inscribed on the sides thereof adapted to be exposed selectively to view through the observation opening by the rotation of the plate, means for rotating said plate to dispose either signal term to view, an electric circuit including one of the trunnions of the plate, a block of insulating material fixed on said last named trunnion, screws disposed in said block and having their inner ends in engagement with said last-named trunnion and their outer ends projecting beyond opposite outer edges of the block respectively, a contact finger included in said circuit and bearing against the edge of the block, said contact finger being adapted to engage the outer end of one of said screws when the plate is positioned to dispose either signal term to view, and an electric lamp included in said circuit and disposed within the casing.

2. In a signal for vehicles, the combination of a casing having an observation opening, a plate including trunnions at its ends rotatably mounted in respective sides of the casing and having signal terms inscribed on the sides thereof adapted to be exposed selectively to view through the observation opening by the rotation of the plate, means for rotating said plate to dispose either signal term to view, an electric circuit including one of the trunnions of the plate, a block of insulating material fixed on said last named trunnion, said block having a plurality of flat sides, screws disposed in said block and having their inner ends in engagement with said last named trunnion and their outer ends projecting beyond opposite outer edges of the block respectively, a contact finger included in said circuit and bearing against the edge of the block, said contact finger being adapted to engage the outer end of one of said screws when the plate is positioned to dispose either signal term to view, and an electric lamp included in said circuit and disposed within the casing.

In testimony whereof, I affix my signature, in the presence of two witnesses.

CYRUS S. VAUGHN.

Witnesses:
 BARBARA E. VAUGHN,
 JENNIE S. CLARK.